United States Patent [19]

Bäbler et al.

[11] Patent Number: 4,554,094

[45] Date of Patent: Nov. 19, 1985

[54] ELECTRICALLY CONDUCTIVE FILLERS

[75] Inventors: Fridolin Bäbler, Marly, Switzerland; Kurt Munk, Grenzach, Fed. Rep. of Germany

[73] Assignee: Ciba-Geigy Corporation, Ardsley, N.Y.

[21] Appl. No.: 626,508

[22] Filed: Jun. 29, 1984

[30] Foreign Application Priority Data

| | | | |
|---|---|---|---|
| Jul. 8, 1983 | [CH] | Switzerland | 3766/83 |
| Sep. 22, 1983 | [CH] | Switzerland | 5153/83 |
| Feb. 9, 1984 | [CH] | Switzerland | 617/84 |

[51] Int. Cl.$^4$ .......... A01B 1/06

[52] U.S. Cl. .......... 252/518; 252/519; 252/520; 252/521

[58] Field of Search .......... 252/518, 519, 520, 521; 524/204, 260, 88; 523/461; 528/362, 490

[56] References Cited

U.S. PATENT DOCUMENTS

| | | | |
|---|---|---|---|
| 3,538,021 | 11/1970 | Achey | 252/506 |
| 4,221,606 | 9/1980 | Funatsu et al. | 524/88 |
| 4,247,337 | 1/1981 | Irvine et al. | 524/88 |
| 4,252,565 | 2/1981 | Irvine et al. | 524/88 |
| 4,304,719 | 12/1981 | Wynne et al. | 252/518 |
| 4,347,173 | 8/1982 | Merian et al. | 524/88 |
| 4,477,608 | 10/1984 | Babler et al. | 524/88 |

*Primary Examiner*—Josephine L. Barr
*Attorney, Agent, or Firm*—Luther A. R. Hall

[57] ABSTRACT

Electrically conductive fillers obtainable by pyrolysis of a mixture of at least one metal phthalocyanine and at least one particular inorganic filler are suitable for the preparation of electrically conductive high molecular weight organic material or inorganic material.

12 Claims, No Drawings

ELECTRICALLY CONDUCTIVE FILLERS

Various fields of application require electrically conductive systems of plastics which, in addition to good electrical properties, also have good mechanical strengths. Although known electrically conductive fillers, for example metal powders, have very good electrical conductivities, they are difficult to incorporate into plastics because of their poor dispersibility, produce inhomogeneous systems and may have an adverse influence on the mechanical properties and promote catalytic decomposition of the plastics.

It has now been found that electrically conductive products which are outstandingly suitable as electrically conductive fillers for systems of plastics and for inorganic materials are obtained by pyrolysing a mixture of a metal phthalocyanine and a particular inorganic filler. Such products have the advantages of the inorganic fillers which are already successfully used at present for improving the mechanical strength of the plastics or the inorganic materials, and are electrically conductive as a result of the coating of pyrolysed phthalocyanine, which adheres well. In addition, they can be incorporated without problems and thus produce homogeneous systems and cause no decomposition.

The invention thus relates to electrically conductive fillers which can be obtained by pyrolysing a mixture of at least one metal phthalocyanine and at least one inorganic filler.

Examples of suitable metal phthalocyanines are the phthalocyanines of copper, iron, nickel, aluminium, cobalt, manganese, tin, silicon, germanium, lead, titanium, chromium, uranium, magnesium, vanadium, molybdenum and zinc, mixtures of two or more different metal phthalocyanines also being possible. The metal phthalocyanines can also be mixed with metal-free phthalocyanines. It is also possible to use, for example, metal phthalocyanines substituted by sulfonic acid, sulfonamide, sulfo-ester, alkyl, aryl, aryl ether or thioester radicals. The metal phthalocyanines can be used in fine or coarse form. For the electrically conductive fillers according to the invention, copper, nickel, cobalt or iron phthalocyanine is preferably used as the metal phthalocyanine, and copper phthalocyanine, for economic reasons especially the crude β-form, is particularly preferred.

Particularly suitable inorganic fillers are glass, quartz, clay minerals, feldspars, silicates, carbonates, rock powders, aluminas, oxides and sulfates, these being either synthetic or naturally occurring materials, for example quartz powder, mica, talc, feldspar, perlite, basalt, asbestos, ground shale, kaolin, wollastonite, chalk powder, dolomite, gypsum, lava, magnesium carbonate, barite, bentones, silica aerogel, lithopones, diatomaceous earths, metal oxides, such as oxides of magnesium, aluminium, titanium, zinc, iron, boron, nickel, chromium, zirconium, vanadium, tin, cobalt, antimony, bismuth or manganese, and mixed oxides thereof, and further metal sulfides, such as zinc, silver or cadmium sulfide, glass powder, glass beads, glass fibres, silicon carbide or cristobalite. The filters mentioned can be used individually or in mixtures and can be fibrous, granular or pulverulent in nature.

Aluminium, wollastonite, titanium dioxide, mica, iron oxide or quartz, especially fine-particled quartz, are preferbly used as fillers.

Electrically conductive fillers in which the organic filler is crystalline or amorphous quartz with a particle size of 0.01 to 1,000 μm, preferably 2 to 200 μm, are of particular interest.

The electrically conductive fillers can be prepared by mixing the pigments to be pyrolysed and the inorganic filler intimately with one another in the dry state or in aqueous suspension, if necessary with grinding, and then filtering the mixture, if mixing is carried out in aqueous suspension, and drying the product. If appropriate, the inorganic filler can already be added during the synthesis of the metal phthalocyanine.

5 to 99, in particular 10 to 50, parts by weight of pigment to be pyrolysed are preferably added per 100 parts by weight of dry starting mixture. The mixture of inorganic filler and metal phthalocyanine thus obtained is then pyrolysed, whereupon the inorganic filler is coated with pyrolysed pigment. The pyrolysis can be carried out under 0.5 to 20 bar, preferably under atmospheric pressure, in the air, in an inert gas, in air with an increased oxygen content or in hydrogen gas. The pressure, gas and increase in temperature as a function of the time are as a rule chosen so that the pigment is pyrolysed in as high a yield as possible of carbon and metal. Air and nitrogen are particularly suitable gases. The pyrolysis takes place at temperatures from 650° to 2,500° C., preferably at 800°-1,200° C. If a 1:1 mixture of quartz powder/Cu phthalocyanine is heated to 1,050° C. in air (under atmospheric pressure), for example, a product consisting of about 61% by weight of silicon dioxide, 30% by weight of carbon, 6.4% by weight of copper and 2.6% by weight of nitrogen is obtained. The electrical conductivity at room temperature is about $10\omega^{-1}\,cm^{-1}$.

Depending on the mixing ratio of pigment/filler, the pyrolysis product is obtained in a cohesive or loose, dark grey to black solid mass and is as a rule broken up and powdered.

The electrically conductive fillers according to the invention are particularly suitable for incorporation into high molecular weight organic or inorganic material. Examples of suitable high molecular weight organic materials are cellulose ethers and esters, such as ethylcellulose, acetylcellulose and nitrocellulose, polyamides, copolyamides, polyethers and polyether-amides, polyurethanes and polyesters, natural resins or synthetic resins, in particular urea/formaldehyde and melamine/formaldehyde resins, epoxy resins, alkyd resins, phenoplasts, polyacetals, polyvinyl alcohols, polyvinyl acetate, stearate, benzoate or maleate, polyvinylbutyral, polyallyl phthalate, polyallylmelamine and copolymers thereof, polyacetals, polyphenyl oxides, polysulfones, halogen-containing vinyl polymers, such as polyvinyl chloride, polyvinylidene chloride and polyvinyl fluoride, as well as polychloroprene and chlorinated rubbers, and furthermore polycarbonates, polyolefins, such as polyethylene, polypropylene and polystyrene, polyacrylonitrile, polyacrylates, thermoplastic or curable acrylic resins, rubber, bitumen, casein, silicone and silicone resins, by themselves or as mixtures. The high molecular weight compounds mentioned can be in the form of plastic compositions, melts or solutions. The electrically conductive fillers can be added to the high molecular weight organic material by the methods customary in the art before or during shaping, or as a dispersion or in the form of preparations. Depending on the intended use, it is also possible to add other substances, for example light stabilisers, heat stabilisers, plasticisers, binders, pigments and/or dyes, carbon blacks, flameproofing agents or other fillers. The electrically conductive filler according to the invention is preferably used in an amount of 0.5 to 70, preferably 15 to 60, percent by weight (per total mixture) based on the high molecular weight organic material. The additions may also be made before or during polymerisation.

Epoxy resins, which are cured with dicarboxylic acid anhydrides, are preferably used as the resin/curing agent component.

Examples of inorganic materials into which the electrically conductive fillers according to the invention can be incorporated are cement, concrete, glass, ceramic materials and inorganic polymers, such as polysilicic acid or polyphosphoric acid derivatives, by themselves or as mixtures with organic polymers, for example asphalt. The electrically conductive fillers according to the invention are preferably used in an amount of 5 to 70, preferbly 15 to 60, percent by weight (per total mixture), based on the high molecular weight inorganic material.

Systems of plastic which have excellent mechanical and electrical properties can be prepared in an economical manner with the fillers according to the invention. The fillers reinforce the carrier material and are distinguished by a good electrical conductivity. Certain plastics, for example epoxy resins, containing the fillers according to the invention also exhibit a constant electrical conductivity over a wide temperature range.

Casting resin compositions, for example epoxy casting resins, containing the fillers prepared according to the invention also exhibit good processing properties (for example very little or no thixotropy) together with a high conductivity, and give mouldings with no reduction in the mechanical properties.

If appropriate, the fillers obtained according to the invention can be incorporated into plastics as a mixture with metals, for example in the form of powders, chips or fibres. The metal to be used here and its concentration depend on the field of use and should not impair the mechanical properties and the stability, for example towards decomposition of the plastics products thus produced. Examples of metals are steel fibres and/or aluminium flakes. However, it is also possible to use carbon fibres instead of metals.

The electrical conductivity can be adjusted in a controlled manner, for example such that compositions which are partly electrically conductive are formed, by dilution with the fillers listed on page 2 or by addition of graduated amounts of the fillers according to the invention to such plastics or to inorganic materials. This is particularly important for control of electrical fields and/or for the breaking down or surface or volume charges.

The electrically conductive fillers according to the invention are not only suitable for the production of polymer compositions, articles made from plastic and coatings which have an antistatic action and are electrically conductive. They can also be used for the production of batteries and other articles in microelectronics, or as sensors, as a catalyst in certain chemical reactions, for the preparation of solar collectors, for shielding of sensitive electronic components and high-frequency fields (EMI shielding), for voltage compensation and corona shielding, for increased rating of electrical installations and machines, for control of electrical fields and charges in electrical equipment or as heating conductors for panel heating.

The following examples illustrate the invention. Parts and percentages are by weight.

EXAMPLE 1

90 parts of quartz powder W1 ® from SIHELCO AG (CH-Birsfelden) are thoroughly mixed with 90 parts of crude β-copper phthalocyanine on a Turbula machine from W. A. Bachofen (CH-Basle) for 30 minutes. The mixture is heated to 1,050° C. in the course of 6 hours in a quartz glass vessel, the lid of which has a small opening, in an oven. After 0.5 hour at this temperature, the mixture is cooled and 157 parts of a grey-black, solid mass are obtained and are powdered in a laboratory mixer. The powder is composed of 61.5% by weight of $SiO_2$, 30% by weight of C, 6.5% by weight of Cu and 2% by weight of N. The electrical conductivity, measured on the compressed powder, is 10 $Scm^{-1}$ at room temperature (2 electrode-measurement on a micro-pressed sample).

EXAMPLES 2 TO 4

The procedure described in Example 1 is repeated, using the compounds shown in Table 1 as the starting mixture. Grey-black powders with the electrical conductivities shown in Table 1 are obtained.

TABLE 1

| Example | Inorganic filler | Metal phthalocyanine | Electrical conductivity** in $Scm^{-1}$ at 20-25° C. |
|---|---|---|---|
| 2 | 80 parts of titanium dioxide (KRONOS ® RN 56) | 20 parts of Cu—Pc* | 3 |
| 3 | 90 parts of titanium dioxide (KRONOS ® RN 56) | 10 parts of Cu—Pc | 1 |
| 4 | 80 parts of quarz powder W ® 6 (SIHELCO) | 20 parts of Cu—Pc | 0.5 |

*Cu—Pc = copper phthalocyanine
**according to F. Beck, "Berichte Bunsengellschaft, Physikalische Chemie" 68 (1964), pages 558-567.

EXAMPLE 5

50 parts of W1 ® from SIHELCO AG (CH-Birsfelden) are thoroughly mixed with 50 parts of nickel phthalocyanine on a Turbula machine from W. A. Bachofen (CH-Basle) for 30 minutes. The mixture is heated to 1,000° C. in the course of 6 hours in a quartz glass vessel, the lid of which has a small opening, in an oven. The mixture is kept at 1,000° C. for 1 hour and then allowed to cool to room temperature. 86.2 parts of a grey-black solid mass are obtained, and are powdered. The electrical conductivity of the resulting powder at room temperature is 12 $Scm^{-1}$.

EXAMPLES 6-10

The procedure described in Example 5 is repeated, using the compounds listed in Table 2 as the starting mixture. Grey-black powders with the electrical conductivities shown in Table 2 are obtained.

TABLE 2

| Example | Inorganic filler | Metal phthalocyanine | Electrical conductivity in $Scm^{-1}$ at 20-25° C. |
|---|---|---|---|
| 6 | 80 parts of aluminium | 20 parts of | 0.6 |

TABLE 2-continued

| Example | Inorganic filler | Metal phthalocyanine | Electrical conductivity in $Scm^{-1}$ at 20-25° C. |
|---|---|---|---|
| | oxide | Cu—Pc* | |
| 7 | 5 parts of zinc oxide | 95 parts of Al—Pc | 18.5 |
| 8 | 5 parts of mica powder | 95 parts of Ni—Pc | 35.5 |
| 9 | 5 parts of talc powder | 95 parts of V—Pc | 60.5 |
| 10 | 40 parts of wollastonite 20 parts of iron oxide (BAYERROX 113M ® from BAYER AG) | 40 parts of Cu—Pc | 6.0 |

*Pc = phthalocyanine

EXAMPLE 11

The procedure described in Example 5 is repeated, but nitrogen is passed slowly through the reaction vessel during the pyrolysis. A grey-black powder with similar properties is obtained.

EXAMPLE 12

270 parts of a filler prepared in the same way as in Example 1 from 135 parts of Quartz powder W12® from SIHELCO AG and 135 parts of the electrically conductive powder obtained according to Example 1 are added to 100 parts of araldite CY 225® (modified bisphenol A epoxy resin with a molecular weight of 380) and 80 parts of the curing agent HY 925® (modified dicarboxylic acid anhydride). The mixture is warmed to 80° C., homogenised with a blade stirrer and deaerated for 3 minutes. The mixture is then poured into moulds prewarmed to 80° C. and is cured at 80° C. for 4 hours and at 140° C. for 8 hours (DIN No. 16 945).

The following data were measured on the Martens rods and sheets thus produced:

| | |
|---|---|
| Glass transition temperature (DTA): (135 × 135 × 4 mm sheet) | 121° C. |
| Heat distortion point according to Martens (DIN No. 53 458): (120 × 15 × 10 mm rods) | 112° C. |
| Flexural strength (DIN No. 53 452, at maximum strength): (135 × 135 × 4 mm sheet) | 93.2 $N/mm^2$ |
| Edge fibre elongation (DIN No. 53 452, at maximum strength): (135 × 135 × 4 mm sheet) | 1.26% |
| Volume resistivity according to DIN No. 53 482: (135 × 135 × 2 mm sheet) | $3 \times 10^8 \Omega cm$ |

EXAMPLE 13

For colouring PVC, a mixture of 65 parts of stabilised PVC, 35 parts of dioctyl phthalate and 25 parts of the product obtained according to Example 1 is prepared and is moved backwards and forwards between two rolls of a roll calender at about 150° C. for 5 minutes. The plasticised PVC film thus obtained has a surface resistivity $R_o$, measured according to DIN 53 482 (electrode arrangement A), of $5.5\times10^{10}$ ωcm.

EXAMPLE 14

25 parts of the product obtained according to Example 1, 37.5 parts of polyethylene wax AC-617® from Allied Chemicals and 125 parts of sodium chloride are kneaded at 80°-110° C. for 6 hours in a laboratory kneader with a capacity of 300 parts by volume. 62.5 parts of MOPLEN MOB-120® from Montecantini are then incorporated into the kneaded mass. The kneaded mass is cooled to 30° C., with the kneader running, and a grey-black pulverulent mass is formed and is finely powdered with about 3 liters of water on a FRYMA gear-type colloid mill Z 050. The resulting suspension is filtered and the press-cake is washed with water until free from chloride. The resulting product is dried in a vacuum drying cabinet at 50°-60° C. 120 parts of a fine, loose, grey-black polyolefin product are obtained; extrusion of the product on a laboratory extruder (temperature: zone 1: 160° C.; zone 2: 190° C.; zone 3: 220° C.; and zone 4: 170° C.) gives a thermoplastic composition. This composition has an electrical volume resistivity of about $4\times10^5$ ωcm, and is outstandingly suitable for the production of injection-moulded articles or of fibres.

EXAMPLE 15

32 parts of the product obtained according to Example 1, 48 parts of DYNAPOL ®L 206 from DYNAMIT-NOBEL, 160 parts of sodium chloride and 25-32 parts by volume of diacetone alcohol are kneaded at 80° C. for about 5 hours in a laboratory kneader with a capacity of 300 parts by volume. Water is then added dropwise, with the kneader running, and the mixture is at the same time cooled, until the kneaded mass has been converted into granules. The granules are ground with a large amount of water on a FRYMA gear-type colloid mill Z 050 and filtered off and the resulting press-cake is washed with water until free from salts and then dried in a vacuum drying cabinet at 65°-70° C. a grey-black pulverulent mass is obtained, which is extruded to a cord on a laboratory extruder and then granulated on a chipping machine. The 40% polyester product thus obtained has an electrical volume resistivity of $10^4$ to $10^5$ ωcm.

EXAMPLE 16

The procedure described in Example 1 is repeated, using 5 parts of quartz powder W1®, instead of 90 parts, and 95 parts of β-copper phthalocyanine, instead of 90 parts. A product containing about 12% by weight of copper is obtained. This product is outstandingly suitable as a catalyst for the reaction described in Example 17 for the preparation of an anthraquinonoid dye for wool.

EXAMPLE 17

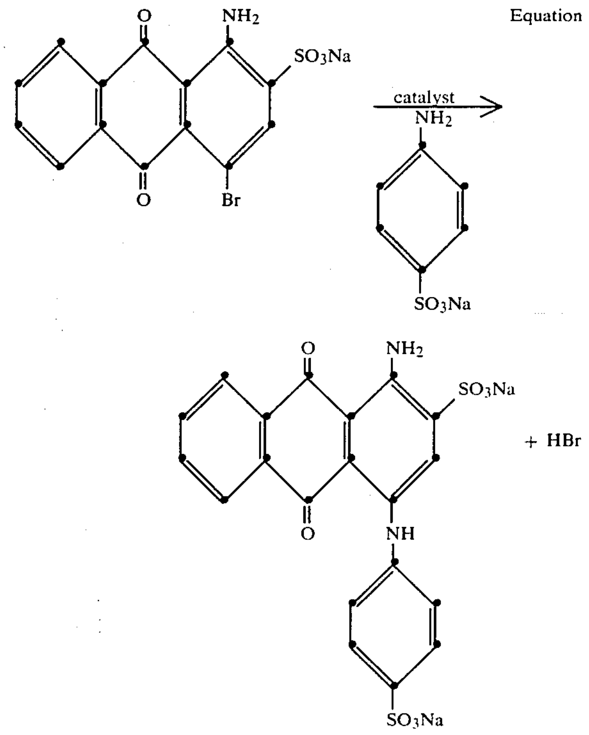

20.2 parts of sodium 1-amino-4-bromoanthraquinone-2-sulfonate are stirred with 300 parts of water and, after addition of 13.8 parts of sodium carbonate, 11.25 parts of 1-aminobenzene-4-sulfone acid are gradually added. 7 portions of in each case 1 part of the finely powdered product obtained according to Example 16 are added, at intervals of 45 minutes, as the catalyst to the mixture, which is heated at 85° C. After the last addition, the mixture is stirred at 85°-90° C. for a further hour, and 7.5 parts of sodium carbonate, 11.25 parts of 1-aminobenzene-4-sulfonic acid and 1 part of the product obtained according to Example 16 are then added. After the mixture has been stirred at 85°-90° C. for 20 hours, 50 parts of sodium chloride are added. The precipitate which separates out on cooling is filtered off at 25° C. The moist material on the suction filter is stirred in 1,000 parts of water of 90° C. and, after addition of 10 parts of a filtering assistant (Kieselgur Hyflo Supercel), the solution is filtered. 135 parts of sodium chloride are added to the dark blue solution (900 parts) at 75° C., with stirring, and the mixture is allowed to cool to 35° C., with stirring. The dye precipitated is filtered off, washed twice with 15% sodium chloride solution and dried. Taking into consideration the sodium chloride content, 18.3 parts of the disodium salt of 1-amino-4-anilinoanthraquinone-2,4'-disulfonic acid are obtained as a dark powder. The dye produces blue shades on wool from an acid bath.

What is claimed is:

1. An electrically conductive filler which is obtained by prolysis of a mixture of at least one metal phthalocyanine and at least one inorganic filler, wherein the mixture contains 5 to 99 parts by weight of metal phthalocyanine per 100 parts by weight of total mixture, and the pyrolysis is carried out at a temperature from 650° to 2,500° C. under a pressure of 0.5 to 20 bar in air, in an inert gas, in air with an increased oxygen content or in hydrogen gas.

2. An electrically conductive filler according to claim 1, in which the metal phthalocyanine is copper, nickel, cobalt or iron phthalocyanine.

3. An electrically conductive filler according to claim 1, in which the metal phthalocyanine is copper phthalocyanine.

4. An electrically conductive filler according to claim 1, in which the metal phthalocyanine is the crude β-form of copper phthalocyanine.

5. An electrically conductive filler according to claim 1, in which the inorganic filler is aluminium oxide, wollastonite, iron oxide, titanium dioxide, mica or quartz.

6. An electrically conductive filler according to claim 1, in which the inorganic filler is crystalline or amorphous quartz with a particle size of 0.01 to 1,000 μm.

7. An electrically conductive filler according to claim 1, in which the pyrolysis is carried out at 800° to 1,200° C. under atmospheric pressure in air.

8. A method of inducing electrical properties in high molecular weight organic material which comprises incorporating thereinto an electrically conductive filler according to claim 1.

9. A method according to claim 8 wherein the high molecular weight organic material is an epoxy resin.

10. A method of inducing electrical properties in inorganic material which comprises incorporating thereinto an electrically conductive filler according to claim 1.

11. High molecular weight organic material containing an electrically condutive filler according to claim 1.

12. An electrically conductive filler according to claim 1 wherein the mixture to be pyrolyzed contains 10 to 50 parts by weight of metal phthalocyanine per 100 parts by weight of total mixture.

* * * * *